(12) United States Patent
Hata et al.

(10) Patent No.: US 8,231,965 B2
(45) Date of Patent: Jul. 31, 2012

(54) RESIN COMPLEX CONTAINING CARBON NANOTUBE AND METHOD FOR PRODUCTION THEREOF

(75) Inventors: Kenji Hata, Ibaraki (JP); Hidekazu Nishino, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 12/451,043

(22) PCT Filed: Apr. 24, 2008

(86) PCT No.: PCT/JP2008/057942
§ 371 (c)(1), (2), (4) Date: Oct. 28, 2011

(87) PCT Pub. No.: WO2008/133299
PCT Pub. Date: Nov. 6, 2008

(65) Prior Publication Data
US 2010/0203316 A1    Aug. 12, 2010

(30) Foreign Application Priority Data
Apr. 24, 2007 (JP) .................. 2007-114604

(51) Int. Cl.
    B32B 27/04    (2006.01)
(52) U.S. Cl. ............. 428/297.4; 428/299.1; 977/753
(58) Field of Classification Search ............. 428/297.4, 428/299.1; 423/447.2; 977/753
    See application file for complete search history.

(56) References Cited

U.S. PATENT DOCUMENTS

| | | | |
|---|---|---|---|
| 7,335,290 B2* | 2/2008 | Miyagi et al. | 205/687 |
| 7,396,798 B2* | 7/2008 | Ma et al. | 502/185 |
| 7,601,421 B2* | 10/2009 | Khabashesku et al. | 428/297.4 |
| 7,632,569 B2* | 12/2009 | Smalley et al. | 428/368 |
| 7,662,313 B2* | 2/2010 | Whiteford et al. | 252/500 |

(Continued)

FOREIGN PATENT DOCUMENTS

| | | |
|---|---|---|
| JP | 2006-8473 | 1/2006 |
| JP | 2006-11296 | 1/2006 |
| JP | 2006-69165 | 3/2006 |
| JP | 2006-97006 | 4/2006 |
| JP | 2006-228818 | 8/2006 |

OTHER PUBLICATIONS

International Search Report issued Jul. 8, 2008 in International (PCT) Application No. PCT/JP2008/057942.

*Primary Examiner* — Rena Dye
(74) *Attorney, Agent, or Firm* — Wenderoth, Lind & Ponack, L.L.P.

(57) ABSTRACT

A carbon nanotubes (CNTs)-containing resin composite comprised of a synthetic resin-impregnated aligned CNTs aggregate to have a specific surface area of at least 600 $m^2/g$. Its production method comprises a step of laying down an aligned CNTs aggregate having grown perpendicularly from a substrate, a step of impregnating the laid-down aligned CNTs aggregate with a resin, and a step of shaping the resin-impregnated aligned CNTs aggregate into a sheet. Accordingly, there are provided a CNTs-containing resin composite having a high CNT content and a high degree of alignment and having a desired shape capable of fully taking the advantages of anisotropy intrinsic to CNTs, and a production method capable of producing it with ease.

3 Claims, 7 Drawing Sheets

U.S. PATENT DOCUMENTS

| | | | |
|---|---|---|---|
| 7,854,991 B2 * | 12/2010 | Hata et al. | 428/408 |
| 2006/0018018 A1 | 1/2006 | Nomura et al. | |
| 2009/0122469 A1 * | 5/2009 | Hatori et al. | 361/525 |
| 2009/0214816 A1 * | 8/2009 | Hata et al. | 428/114 |
| 2009/0272935 A1 * | 11/2009 | Hata et al. | 252/70 |
| 2010/0015922 A1 * | 1/2010 | Kawai | 455/63.1 |
| 2010/0019629 A1 * | 1/2010 | Amaya et al. | 310/68 R |
| 2010/0203316 A1 * | 8/2010 | Hata et al. | 428/299.1 |

* cited by examiner

RESIN COMPLEX CONTAINING CARBON NANOTUBE AND METHOD FOR PRODUCTION THEREOF

TECHNICAL FIELD

The present invention relates to a carbon nanotubes-containing resin composite excellent in mechanical strength and a method for producing the same. Resin as referred to in this description means a synthetic resin.

BACKGROUND ART

Recently, application of carbon nanotubes (hereinafter referred to as CNTs) to various functional materials is specifically noted, as CNTs have excellent physical properties such as mechanical properties, optical properties and electric properties. In one field of such CNTs application, there is a strength-enhanced resin composite of which the lightweightness and the excellent mechanical strength are specifically noted; and the composite is expected to be applicable to many industrial materials of, for example, airplanes, automobiles, electronic parts, etc.

CNTs are known to be extremely excellent in mechanical properties such as tensile strength, Young's modulus of elasticity, etc. (e.g., see Non-Patent Document 1); and for producing CNTs-containing resin composites having excellent mechanical properties, preferably, the CNTs have a large specific surface area, the CNT content is high and the CNTs are aligned in a predetermined direction. The reasons for these are as follows: CNTs having a large surface area means that they are scarcely bundled and contain few impurities; and not only a resin could efficiently penetrate into the space between CNTs but also the area of the interface between the resin and CNTs increases, and therefore the power transmission efficiency between resin and CNTs can increase. Similarly, when the CNT content is high, then the area of the interface between resin and CNTs increases and the amount of CNTs having excellent mechanical properties increases, and therefore the mechanical strength of the CNTs-containing resin composite increases. Further, when CNTs are aligned, then the vector acting on CNTs can be controlled in the direction in which the strength of CNTs is the highest.

A CNTs-containing resin composite comprising CNTs and resin is proposed, which is produced by kneading CNTs in a matrix of an organic polymer such as a thermoplastic resin, a thermosetting resin a rubber, a thermoplastic elastomer or the like followed by applying a magnetic field in a predetermined direction to the resulting composition to thereby make the CNTs therein aligned in a predetermined direction and fixed in that state (see Patent Document 1).

However, CNTs have an extremely high aspect ratio and readily stick to each other by the van der Waals force, and therefore it is extremely difficult to align CNTs that are dispersed as unaligned in the initial stage in a highly viscous matrix, by post-treatment. In addition, CNTs have a low chemical activity and have an extremely low affinity to epoxy resins and others, and therefore it is difficult to produce a CNTs-containing epoxy resin composite having a high CNT content.

A method is proposed, which comprises injection-molding a CNTs-dispersed resin liquid to produce a fibrous CNTs-containing resin composite (see Patent Document 2). According to this, CNTs are aligned in the injection-molding step. Specifically, according to this, aligned CNT fibers having a high CNT content can be produced.

In this method, however, high-density aligned CNTs are introduced into a resin in the injection-molding step, and therefore only a fibrous CNTs-containing resin composite can be obtained in which CNTs are aligned in the machine direction. Specifically, even in this method, it is still impossible to control the alignment direction of CNTs in the CNTs-containing resin composite in a desired manner, and it is also impossible to produce a CNTs-containing resin composite having a desired shape in a simplified manner.

In other words, production of an aligned CNTs-containing resin composite taking the advantages of the anisotropic properties intrinsic to CNTs and having a high strength and a desired shape has heretofore been extremely difficult because of the above-mentioned situation.

On the other hand, the inventors of the present application have succeeded in obtaining greatly large-scaled CNTs aggregate of high alignment as compared with those in conventional methods, according to a method of chemical vapor deposition (hereinafter referred to as CVD) of CNTs in the presence of a metal catalyst in which a minor amount of water vapor is made to exist in the reaction atmosphere, and have reported it in Non-Patent Document 2. According to the method, CNTs aggregate of long aligned single-walled CNTs of high purity can be obtained, and these are expected to greatly contribute toward production of device materials, component materials, electroconductive materials, functional materials, etc. CNTs aggregate as referred to in this description means a structure of multiple CNTs (e.g., having nanotube density of at least $5 \times 10^{11}$ nanotubes/cm$^3$) as aggregated in the form of layers or bunches.

Non-Patent Document 1: M. F. Yu et al., Phys. Rev. Lett., 2000, 84, 5552

Non-Patent Document 2: Kenji Hata et al., Water-Assisted Highly Efficient Synthesis of Impurity-Free Single-Walled Carbon Nanotubes, SCIENCE, 2004, 11, 19, Vol. 306, pp. 1362-1364

Patent Document 1 JP-A 2002-273741

Patent Document 2: JP-A 2004-211239

DISCLOSURE OF THE INVENTION

Problems that the Invention is to Solve

The aligned CNT aggregates produced according to the method have a low density and are soft feeling. Therefore, even though producing a composite of those aligned CNTs aggregate as such with a resin is tried by impregnating CNTs with a resin, the space between CNTs could not be filled up with the resin but the CNTs may be bundled up with the resin, and therefore in the resulting composite, the CNT parts and the resin parts may be topically separated from each other. As a result, since the resin and the CNTs could not be uniformly mixed, it is difficult to obtain a composite that satisfies desired mechanical properties. CNTs produced on a substrate that carries a catalyst thereon are aligned perpendicularly to the catalyst film surface on the substrate; and when these are processed to form a sheet-like resin composite, it is difficult to make CNTs in the resin composite aligned in a desired direction.

The present invention has been made in consideration of the prior-art situation as above, and its first object is to provide a CNTs-containing resin composite having a high CNT content and a high degree of alignment and having a desired shape capable of fully taking the advantages of anisotropy intrinsic to CNTs, A second object of the invention is to provide a production method capable of producing such a CNTs-containing resin composite with ease.

Means for Solving the Problems

To attain the first object as above, the invention provides a CNTs-containing resin composite comprised of a resin-impregnated aligned CNTs aggregate, wherein the aligned CNT aggregate is formed to have a specific surface area of at least 600 m²/g. In particular, the CNT content is preferably from 5 to 50 mass %. To attain the second object, the invention provides a method for producing a CNTs-containing resin composite comprised of a synthetic resin-impregnated aligned CNTs aggregate, which comprises a step of laying down an aligned CNTs aggregate having grown perpendicularly from a substrate (step 2), a step of impregnating the laid-down aligned CNTs aggregate with a resin (step 4, 7), and a step of shaping the resin-impregnated aligned CNTs aggregate into a sheet (step 5, 8). Preferably, in the laying-down step, a sheet-like transfer material is put on the aligned CNTs aggregate perpendicularly grown on the substrate (step 1) and a unidirectional pressure force is applied thereto.

Preferably, the sheet-like transfer material is a fluororesin; or a catalyst is patterned in a predetermined shape and the CNTs-containing resin composite is formed to have the patterned shape; or the alignment direction of the laid-down aligned CNTs aggregate is the in-plane direction of the substrate; or the weight density of the laid-down aligned CNTs aggregate is at least 0.05 g/cm³.

As mentioned above, when the sheet-like transfer material is a fluororesin, then the CNTs composite may be readily peeled off; and when the catalyst is patterned, then the CNTs-containing resin composite having a desired shape is easy to produce. When the weight density of the laid-down aligned CNTs aggregate is least 0.05 g/cm³, then CNTs may be more firmly fixed, and therefore. CNTs are prevented from being bundled up in impregnating CNTs with a resin and the space between the CNTs could be well filled up with the resin. Accordingly, the resin and the CNTs can be more uniformly mixed to give a composite that satisfies the desired mechanical properties. When the weight density of CNTs is at most 0.5 g/cm³, the space between the CNTs could have a suitable distance therefore facilitating resin impregnation thereinto.

As the substrate in production, preferred is a flexible substrate such as a metal substrate or the like. This is because, such a flexible substrate does not crack even when a pressure step with a hot press, a roller press or the like is applied thereto, different from silicone substrates, quartz substrates, etc.

Preferably, the height of the aligned CNTs aggregate grown perpendicularly from the substrate is at least 10 μm. Having the height level, the aligned CNTs aggregate may be laid down as a whole in the laying-down step; and when the height is at least 10 μm, then the aligned CNTs aggregate may be prevented from forming an island-like dispersed structure.

The wording "sheet-like" as referred to in this description means a flattened thin plate material, including films, foils, ribbons, etc.

Having the above-mentioned constitution, the invention exhibits a great effect in providing a CNTs-containing resin composite having a high CNT content and a high degree of alignment and having a desired shape capable of fully taking the advantages of anisotropy intrinsic to CNTs.

BEST MODE FOR CARRYING OUT THE INVENTION

Best modes for carrying out the invention are described in detail hereinunder.

The CNTs-containing resin composite (hereinafter this may be simply referred to as "composite") of the invention comprises a resin and aligned CNTs aggregate, and fully takes the advantages of anisotropy intrinsic to CNTs, and expresses the anisotropy of the mechanical strength in the CNTs alignment direction and the direction perpendicular thereto. The composite is significantly improved in point of the mechanical properties thereof in the CNTs alignment direction, as compared with a material of resin alone, or that is. CNT-free resin; and therefore it is favorable for high-strength components.

For the resin for use in the composite of the invention, various resins are usable. Typically preferred are, for example, epoxy resins or polyvinyl alcohol resins.

As its form, the composite of the invention may have a sheet-Ike shape. In the composite, the CNT content is preferably at least 5 mass %, more preferably at least 10 mass %, even more preferably at least 20 mass %, and its uppermost limit may be 50 mass %, more preferably 40 mass %. When the CNT content is not lower than the lowermost limit, then CNTs may be more firmly fixed, and therefore, CNTs are prevented from being bundled up in impregnating CNTs with a resin and the space between the CNTs could be well filled up with the resin. Accordingly, the resin and the CNTs can be more uniformly mixed to give the composite that satisfies the desired mechanical properties. When the CNT content is not higher than the uppermost limit, then the space between the CNTs could have a suitable distance therefore facilitating resin impregnation thereinto.

It is preferred that the tensile strength of the composite of the invention in the CNTs alignment direction is at least 2 times the tensile strength of the resin not containing CNTs, more preferably at least 3 times. It is also preferred that the Young's modulus of elasticity in the CNTs alignment direction of the composite is at least 2 times the Young's modulus of elasticity of the resin not containing CNTs. It is further preferred that a larger-to-smaller ratio between the tensile strength of the composite in the alignment direction of CNTs and that in the direction perpendicular thereto be such that the larger one is at least 1.5 times, more preferably at least 3 times, the value of the smaller one. It is further preferred that a larger-to-smaller ratio between the Young's modulus of elasticity of the composite in the alignment direction of CNTs and that in the direction perpendicular thereto be such that the larger one is at least 1.5 times, more preferably at least 2 times, the value of the smaller one.

The final thickness of the composite of the invention may be controlled by changing the height and the density of the CNTs aggregate immediately after production of the composite. The thickness is preferably from 10 μm to 1 cm or so in consideration of using the composite for high-strength components. For further strength enhancement or for anisotropy removal, multiple composites may be piled up and shaped. In such a case, the alignment direction of the multiple composites may be the same or different. Further, multiple CNTs aggregate may be piled up and produced into a composite.

The shape of the plan view of the composite of the invention may have any desired pattern, depending on the patterning of the catalyst film to be used in producing the CNTs aggregate to be mentioned below and the cutting of the composite with a laser cutter, etc. The shape of the composite may have a much larger dimension as compared with that of the bundles of multiple fibrous composites.

CNTs in the composite of the invention may be single-walled CNTs, or double-walled CNTs, or may also be in the form of a mixture of single-walled CNTs and double-walled or triple-walled or more multi-walled CNTs in any ratio. Especially for use for high-strength components, single-walled CNTs are preferred as excellent in mechanical properties.

In case where the composite of the invention is used in applications where the purity of CNTs therein is a matter of concern, the purity may be preferably at least 98 mass %, more preferably at least 99 mass %, even more preferably at least 99.9 mass %. Using the production method that the present inventors reported in Non-Patent Document 2, the above-mentioned high-purity aligned CNTs aggregate can be obtained not requiring purification treatment; and the desired composite can be produced using them. The high-purity CNTs to be used contain few impurities and therefore can exhibit the original properties of CNTs. The purity as referred to in this description is determined through elementary analysis with fluorescent X-ray, and is expressed as mass % of CNTs in the product.

CNTs for use in the composite of the invention have an extremely large specific surface area of at least 600 m$^3$/g; preferably from 600 to 2600 m$^2$/g, more preferably from 800 to 2600 m$^2$/g, even more preferably from 1000 to 2600 m$^2$/g. The value of the specific surface area is derived from the liquid nitrogen adsorption-desorption isothermal chart of CNTs measured at 77K with BELSORP-MINI (by BEL Japan) (in which the adsorption equilibrium time is 600 seconds). Supposedly when CNTs aggregate having a specific surface area of less than 600 m$^2$/g are used, CNTs in such CNTs aggregate may be bundled and may contain a large amount of impurities, and therefore resin could not efficiently penetrate into the space of CNTs and the area of the interface between resin and CNTs is small, and accordingly, a composite satisfying the desired mechanical properties could not be obtained.

With reference to the drawings attached hereto, the production method for the composite of the invention is described below.

First, using a well-known CVD apparatus, a plurality of CNTs are grown in a predetermined direction on a substrate carrying a metal catalyst thereon while a catalyst activator (e.g., moisture) is made to present in the reaction atmosphere, thereby producing aligned CNTs aggregate.

For the carbon compound as the starting carbon source in CVD, preferred are hydrocarbons, especially lower hydrocarbons, e.g., methane, ethane, propane, ethylene, propylene, acetylene and others, like before. One or more of these may be used; and if acceptable under the reaction condition, use of oxygen-containing compounds having a low carbon number may also be taken into consideration, including lower alcohols such as methanol, ethanol, etc., as well as acetone, carbon monoxide, etc.

The atmosphere gas in the reaction may be any one not reacting with CNTs and inactive at the CNT growth temperature, and its examples include helium, argon, hydrogen, nitrogen, neon, krypton, carbon dioxide, chlorine, etc., and their mixed vapors. Especially preferred are helium, argon, hydrogen, and their mixed vapors.

The pressure of the reaction atmosphere may be any one under which CNTs have been produced until now, and is preferably from $10^2$ Pa to $10^7$ Pa (100 atmospheres), more preferably from $10^4$ Pa to $3 \times 10^6$ Pa (3 atmospheres), even more preferably from $5 \times 10$ Pa to $9 \times 10$ Pa.

The catalyst to be in the reaction system may be any one heretofore used in production of CNTs, and its examples include iron chloride thin film, iron thin film formed by sputtering, iron-molybdenum thin film, alumina-iron thin film, alumina-cobalt thin film, alumina-iron-molybdenum thin film, etc.

The amount of the catalyst may fall in any range in which CNTs have heretofore been produced. For example, when an iron metal catalyst is used, its thickness is preferably from 0.1 nm to 100 nm, more preferably from 0.5 nm to 5 nm, even more preferably from 1 nm to 2 nm.

The catalyst patterning method may be any one in which the catalyst metal may be directly or indirectly patterned; and any of a wet process or a dry process is employable. Concretely, for example, employable is a direct patterning method using a mask or according to nanoimprinting, soft lithography, printing, plating or the like; or a method comprising patterning any other material capable of selectively adsorbing a catalyst on a substrate followed by making the material selectively adsorb a catalyst.

For the substrate of carrying a catalyst thereon, usable are various materials in accordance with the use thereof; and for example, foil-type metal substrates comprising a specific Ni-base alloy are suitable in view of the flexibility and the workability thereof as compared with silicon substrates. Concretely usable are Ni-base alloys comprising Ni—Fe, Ni—Cr, Ni—Fe—Cr or the like and containing at least 20 atomic % of Ni. Needless-to-say, any other alloys than these are also usable.

The temperature in the growth reaction in CVD may be suitably determined in consideration of the reaction pressure, the catalyst metal, the starting carbon source, etc. In case where moisture exists in the atmosphere, the temperature range is preferably so defined that the moisture could fully exhibit its effect. Concretely, the temperature is preferably from 600° C. to 1000° C., more effectively from 650° C. to 900° C.

In CVD, the amount of water to be in the atmosphere may be slight, and for example, it may be from 10 ppm to 10000 ppm, more preferably from 50 ppm to 1000 ppm, even more preferably from 200 ppm to 700 ppm. The presence of water may greatly promote the growth of CNT.

The thus-formed CNTs aggregate is aligned perpendicularly to the catalyst film forming surface of the substrate, and its height is preferably from 10 μm to 1 cm or so, and their weight density is preferably from 0.01 to 0.05 g/cm$^3$ or so.

The production method for aligned CNTs aggregate is already known, and its further detailed description is omitted herein. For the method of growing a large amount of perpendicularly aligned CNTs in a reaction atmosphere containing water therein, employable is the production method for aligned CNTs aggregate that the same applicant as that of the present invention has previously proposed (see Non-Patent Document 2 or PCT/JP2008/51749).

In the production method for the composite of the invention (see FIG. 1), for example, a transfer sheet of a fluororesin is put on the free side (the side remoter from the catalyst film forming surface of the substrate) of the aligned CNTs aggregate that have grown perpendicularly to the catalyst film forming surface of the substrate in the manner as above (step 1), and a pressure force is applied in one direction between the substrate and the transfer sheet to thereby lay down the aligned CNTs aggregate and compress them (step 2). Accordingly, the aligned CNTs aggregate sticks to the transfer sheet, and in that condition, the substrate is peeled off (step 3). The pressure force in this stage may be applied at room temperature, for example, using a roller press unit equipped with a pair of rollers (to be mentioned below). The pressure force of the roller press unit is preferably so defined that the alignment direction of the laid-down aligned CNTs aggregate could be in the in-plane direction of the substrate (or the transfer sheet) and the weight density thereof could be from 0.05 g/cm$^3$ to 0.5 g/cm$^3$. As the fluororesin sheet, for example, usable is any one excellent in transferability such as Teflon (registered trademark) sheet, etc. Not limited to those of fluororesin, the transfer sheet may be made of any other material excellent in transferability.

Figure 1:
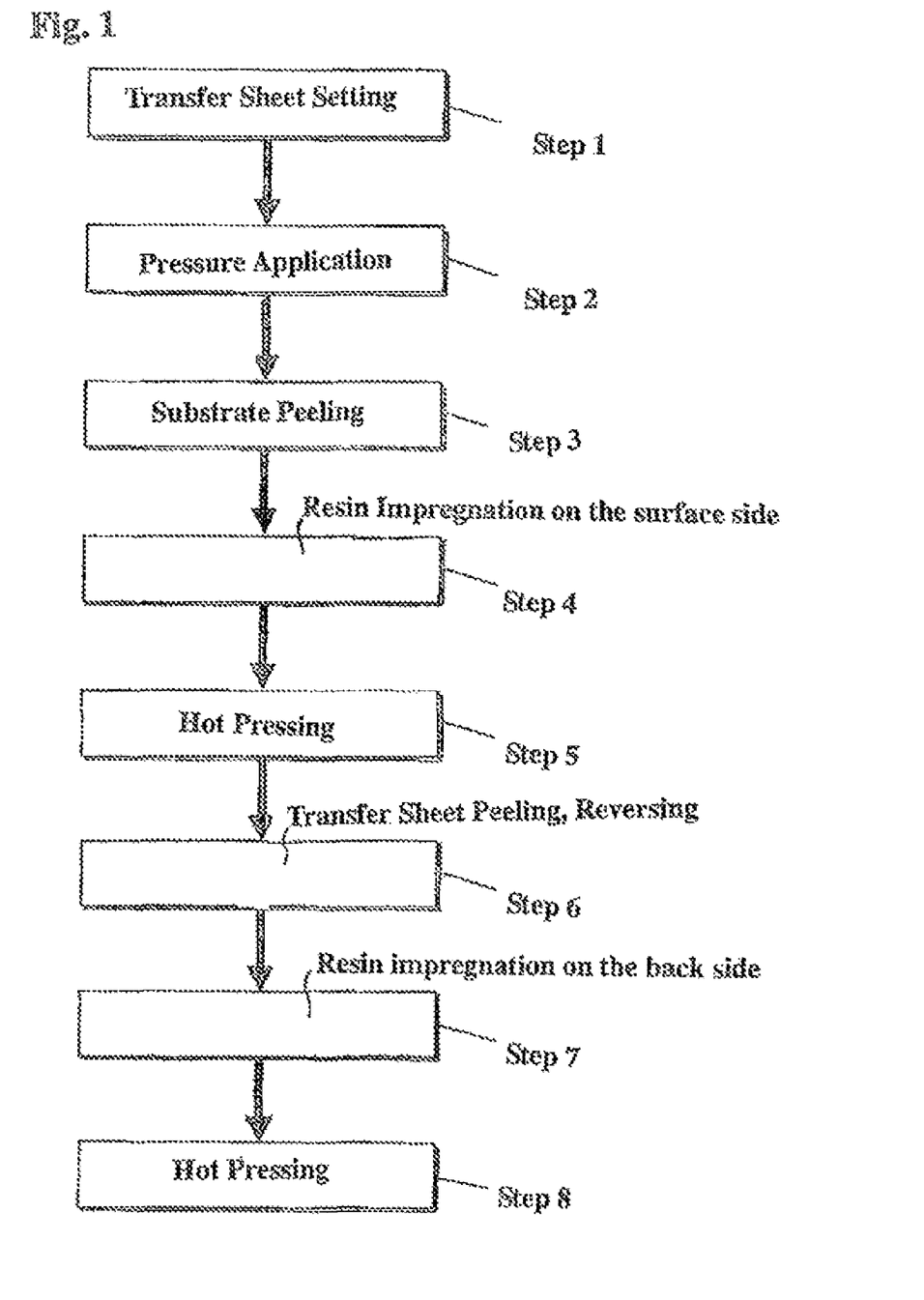
FIG. 1 is a flowchart of the production method of the invention.

Next, a resin is infiltrated into the CNTs aggregate sticking to the transfer sheet with their alignment direction being in the in-plane direction of the transfer sheet, on the substrate-peeled side thereof (step 4). For the resin infiltration method, employable are a spin coating method, a dip coating method, a bar coating method, a vacuum impregnation method, etc. After the resin impregnation thereinto, the sheet is hot-pressed to cure the resin-impregnated CNTs aggregate (step 5). The hot-pressing temperature and the treatment time may vary depending on the type of the resin to be used. For example, when an epoxy resin is used, the temperature may be from 100 to 250° C. and the time may be from 30 to 180 minutes or so.

After the resin is impregnated into one surface and cured therein, the transfer sheet is peeled off from the cured composite, and the cured composite is turned over (step 6), and a resin is again impregnated thereinto in the same manner as above (step 7), and thereafter cured by hot pressing (step 8). Accordingly, a finished product of a sheet-like composite where both surfaces of the CNTs aggregate are coated with the resin is obtained.

EXAMPLES

Concrete Examples and Comparative Examples are shown below by which the effects of the invention are described in detail.

Example 1

Figure 2:
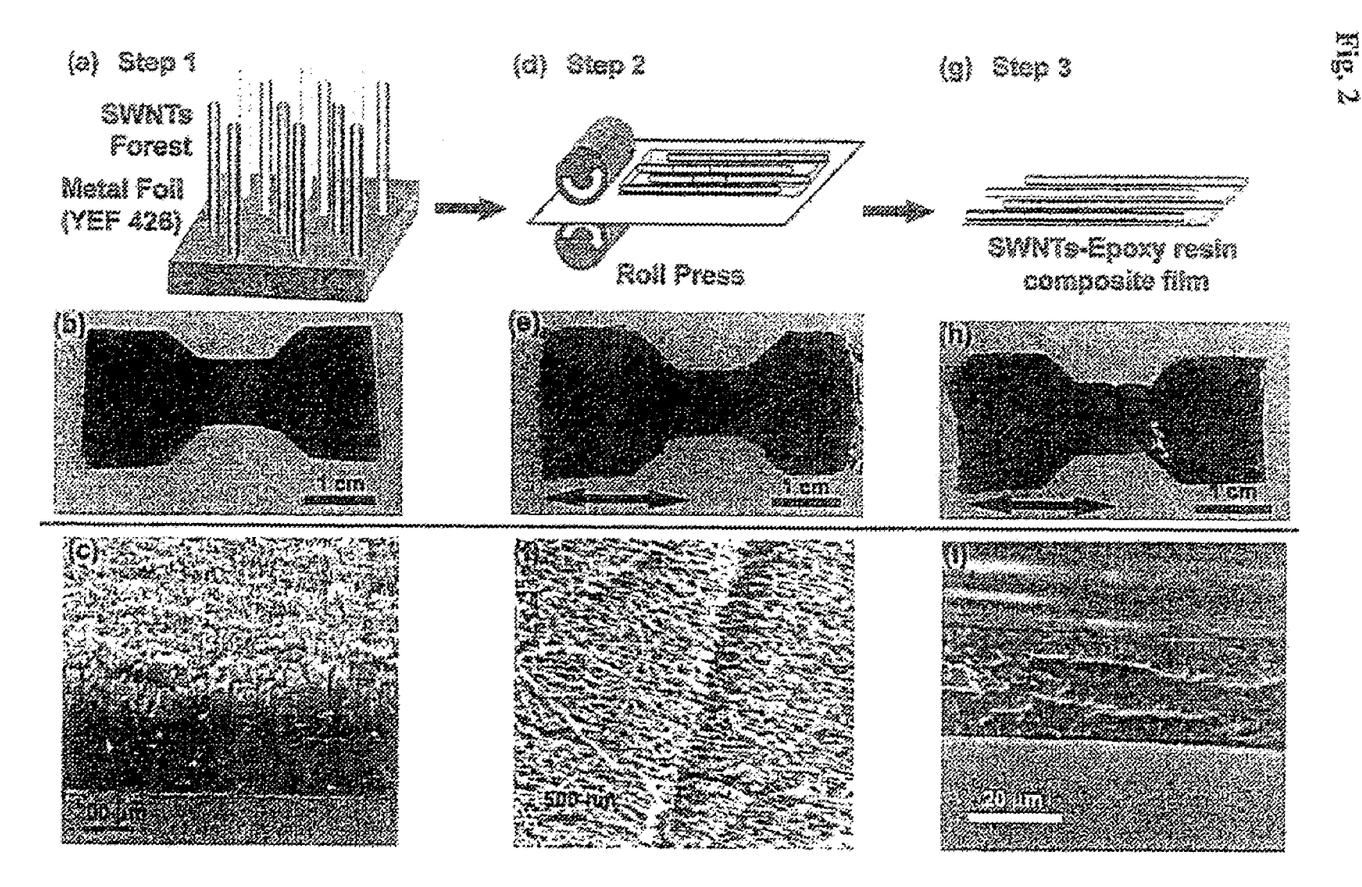
FIG. 2 shows conceptual views of one example of the production method of the invention, and electron microscopic images of the composition in each step.

Aligned CNTs aggregate was drown through CVD under thh condition mentioned below.
Carbon compound: ethylene, feeding speed 100 seem
Atmosphere gas: helium/hydrogen mixed gas, feeding rate 1000 sccm, 1 atmospheric pressure
Water concentration: 150 ppm
Reaction temperature: 750° C.
Reaction time: 10 min
Metal catalyst: iron thin film, thickness 1 mm
Substrate material: metal (YEF426, Ni 42%+Cr 6%+balance of Fe size 40 nm×40 mm
The catalyst film was formed on the substrate using a sputtering vapor deposition apparatus. This is an iron thin film having a thickness of 1 nm, as in FIG. 2(b).

Thus produced, the aligned single-walled CNTs aggregate (SWNTs forest) grew in the perpendicular direction from the catalyst film forming surface of the substrate (metal foil), as in the schematic view of FIG. 2(a) and the scanning electron microscopic (SEM) image of FIG. 2(c); and the mean diameter thereof was 2.8 nm, the mean height thereof was about 300 μm, the purity thereof was 99.9 mass % the specific surface area thereof was 1000 m$^2$/g, and the weight density thereof was 0.03 g/cm$^3$.

A transfer sheet made of a fluororesin (Teflon (registered trademark)) (40 mm×40 mm×1 mm) was put on the free side of the aligned single-walled CNTs aggregate, and with the aligned single-walled CNTs aggregate sandwiched between the substrate and the fluororesin-made transfer sheet, this was led to pass through a roller press unit (roll press) through which the aligned single-walled CNTs aggregate was laid down on the surface of the substrate and compressed, as in FIG. 2(d). Accordingly, the laid-down aligned single-walled CNTs aggregate was highly densified and transferred onto the transfer sheet, and then the metal substrate was peeled off. With that, 2 g of a composition prepared by mixing an epoxy resin (trade name, Epoxylite R-2 by Nilaco) and a curing agent (trade name, Epoxylite C-302 by Nilaco) in a ratio by weight of 5/1 was impregnated into the CNTs aggregate thus transferred onto the transfer sheet with their alignment direction kept in the in-plane direction of the transfer sheet and highly densified thereon (see FIG. 2 (e), (f)), by spin coating (2000 rpm, 60 seconds), and then this was hot-pressed (5 tons, 150° C., 1 hour) to cure the resin.

Next, the transfer sheet was peeled off from the aligned single-walled CNTs aggregate impregnated with resin on one side thereof, and turned over; and then under the same condition as above, the other side of the sheet was impregnated with a resin by spin coating. Next, this was hot-pressed (5 tons, 150° C., 1 hour) to cure the resin, thereby giving an aligned single-walled CNTs-containing epoxy resin composite having a thickness of 41 μm (see FIG. 2 (g), (h), (i)).

Figure 6:
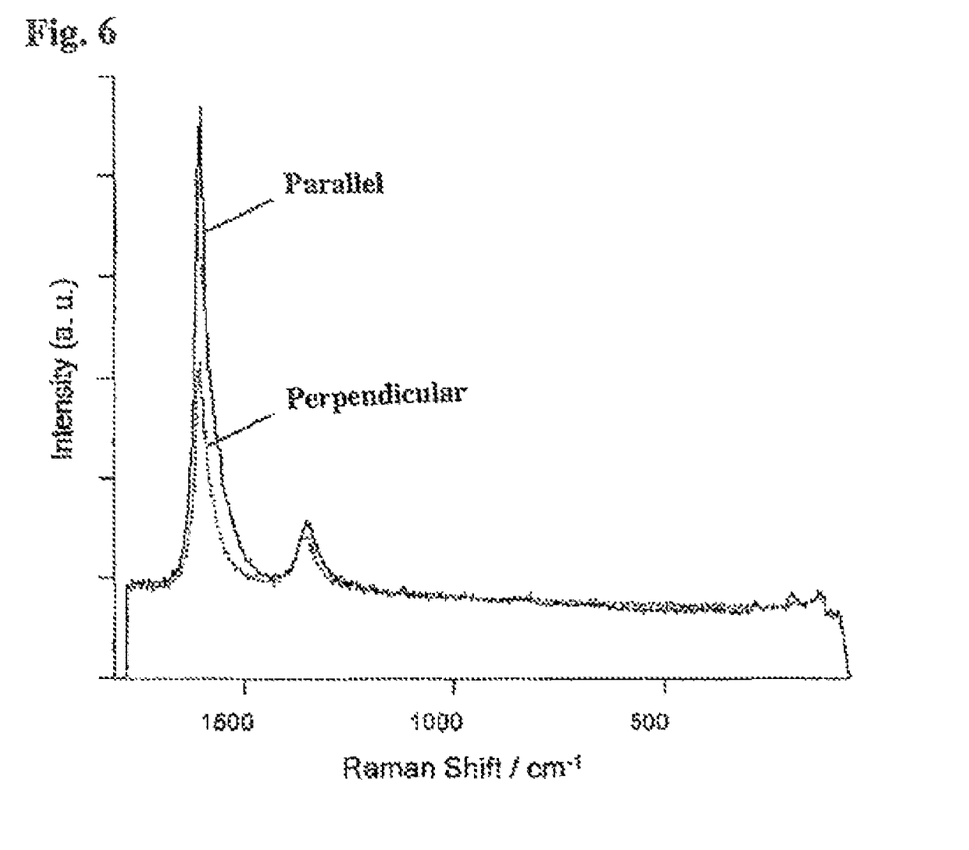
FIG. 6 is a graph of the polarization Raman spectrum of the composite in Example 2.

The measurement data of the tensile strength and the Young's modulus of elasticity of the composite and the epoxy resin alone are shown in Table 1. In Table 1 and FIG. 6, "parallel" means the direction parallel to the alignment direction of CNTs; and "perpendicular" means the direction perpendicular to the alignment direction of CNTs.

Figure 3:
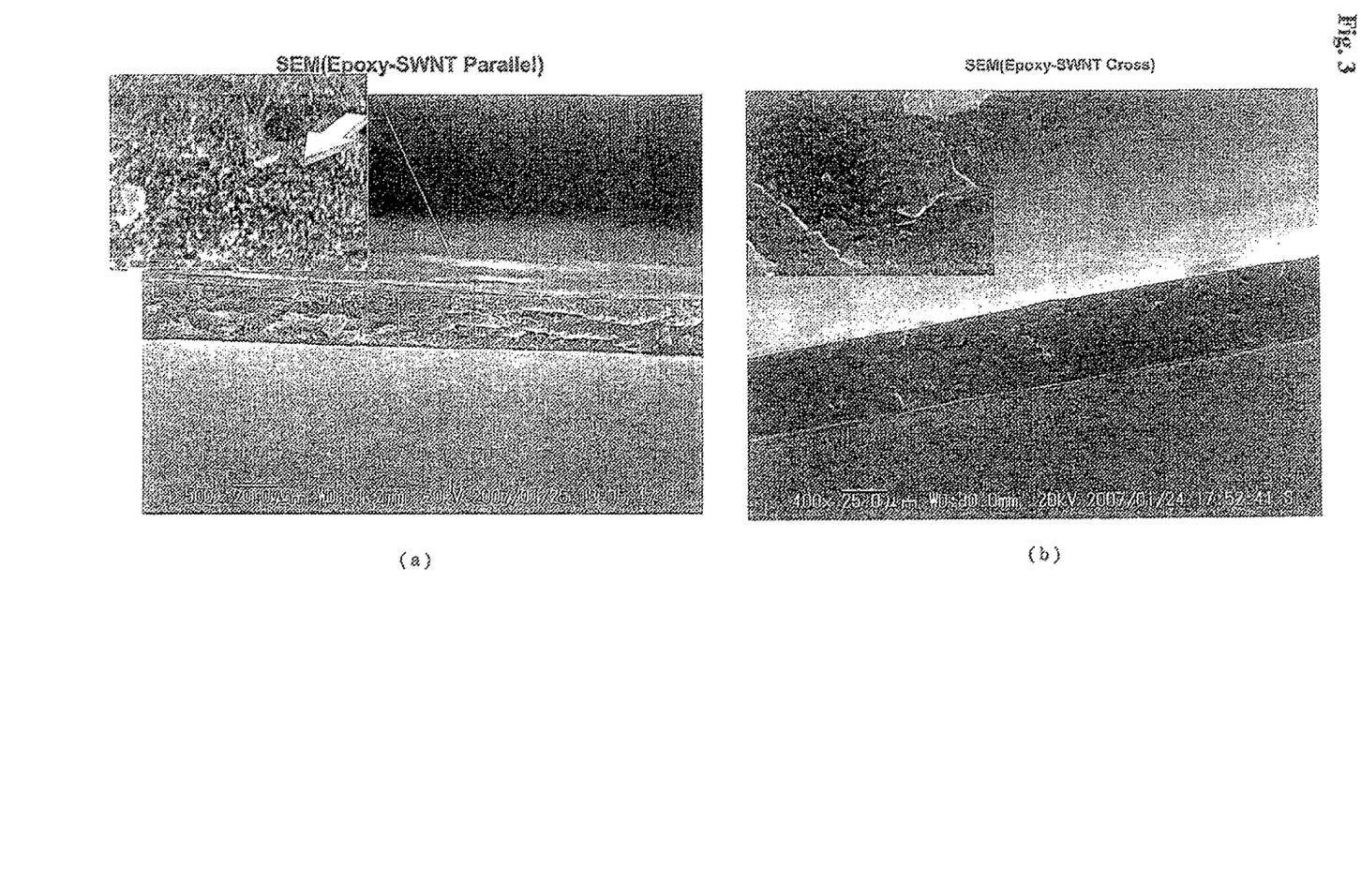
FIG. 3 shows scanning electron microscopic (SEM) images of the composite in Example 1.

After the tensile test, the broken surface of the sample was observed with a scanning electron microscope (SEM), which confirmed that the composite produced according to the invention had neither pores nor cracks and the CNTs and the resin were uniformly mixed therein and the CNTs were kept aligned (see FIG. 3(a) is in the alignment direction, and (b) is in the direction perpendicular to the alignment direction). From these, it is known that the invention is effective for production of aligned CNTs-containing composite.

Figure 4:
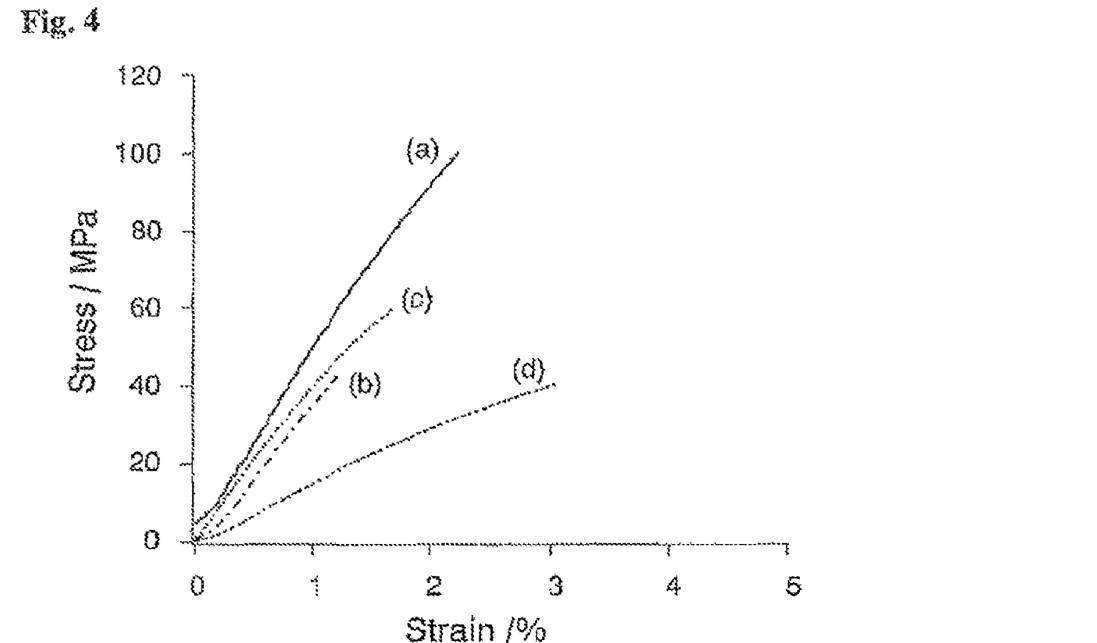
FIG. 4 is a graph showing the tensile test result of the composite in Example 1.

From the measurement data in Table 1 and the tensile test result in FIG. 4, it is known that the tensile strength in the CNTs alignment direction (FIG. 4(a)) of the composite of the invention is 2.3 times the tensile strength in the direction perpendicular thereto (FIG. 4(b)), 1.6 times the tensile strength of the non-aligned composite (FIG. 4(c)), and 2.5 times the tensile strength of the base, epoxy resin (FIG. 4(d)). The Young's modulus of elasticity in the CNTs alignment direction of the composite of the invention is 3.3 times that of the base, epoxy resin alone.

Figure 5:
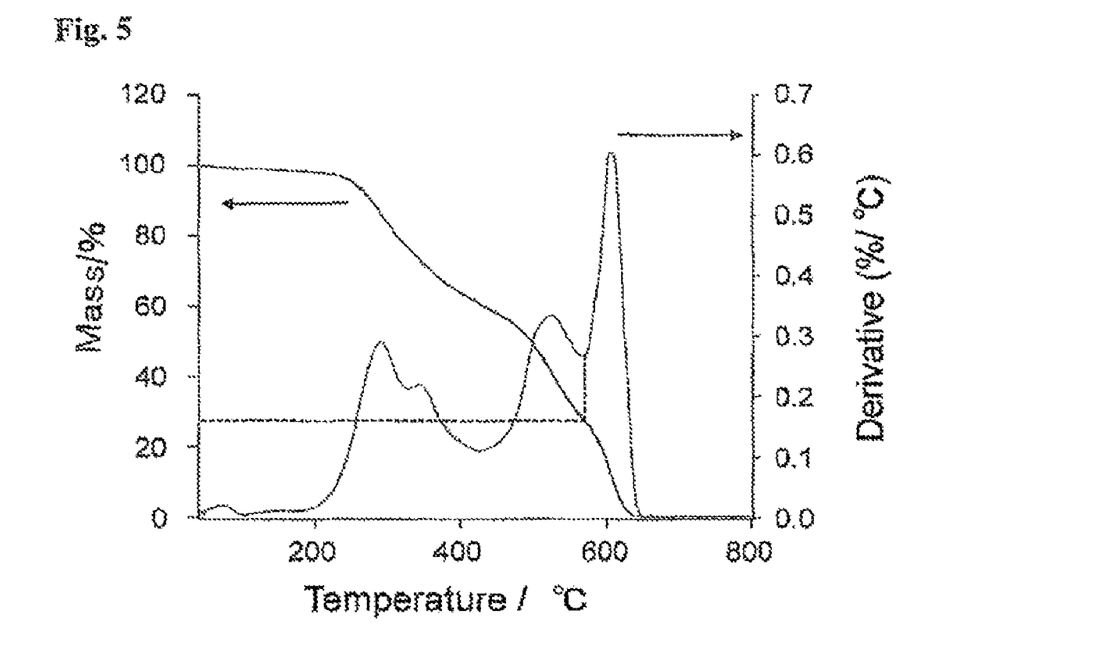
FIG. 5 is a graph showing the thermal weight measurement result of the composite in Example 1.

On the differential thermogravimetric analysis curve of FIG. 5 showing the relationship between temperature and weight, the weight reduction in the range of 570° C. or lower is caused by the combustion of the epoxy resin, the weight reduction at around 600° C. is caused by the combustion of CNTs, and the weight reduction ratio at around 570° C. greatly increases; and from these, the CNT weight content in the composite is computed as 26°/CNTs alone could be taken out by firing the resin, and accordingly, the specific surface area of CNTs could be measured.

Using a Raman spectrometer, the sample was irradiated with laser light in the CNTs alignment direction and in the direction perpendicular to the alignment direction, and the polarization Raman spectra thereof were drawn. As in FIG. 6, it is known that, in the G band region (1590 cm$^{-1}$) the data in irradiation in the direction parallel to the alignment direction are higher than those in irradiation in the direction perpendicular to the alignment direction (about 1.8 times). This confirms that the CNTs in the composite of the invention had a high degree of alignment,

TABLE 1

|  | Tensile Strength (MPa) | Young's Modulus of Elasticity (GPa) |
| --- | --- | --- |
| CNT-Epoxy Composite (parallel) | 100.0 | 5.0 |
| CNT-Epoxy Composite (perpendicular) | 43.0 | 3.6 |
| Epoxy Resin Alone | 40.7 | 1.5 |

Example 2

The same substrate with aligned single-walled CNT aggregates grown thereon as in Example 1 was used. A transfer sheet made of a fluororesin (Teflon (registered trademark)) was put on the aligned single-walled CNTs aggregate, and roll-pressed in a predetermined direction, whereby the CNTs were turned over on the surface of the substrate, and the thus-compressed aligned single-walled CNTs aggregate was transferred onto the transfer sheet. 2 g of a composition prepared by mixing polyvinyl alcohol (trade name, MW85000-146000 by Sigma Aldrich) and a curing agent (ethanol/water=50%/50% mixed liquid) in a ratio by weight of 1/10 was impregnated into the aligned single-walled CNTs aggregate thus transferred onto the transfer sheet and highly densified thereon, by spin coating (2000 rpm, 60 seconds), and then this was hot-pressed (5 tons, 150° C., 1 hour) to cure the resin.

Next, the transfer sheet was peeled off from the aligned single-walled CNTs aggregate impregnated with resin on one side thereof, and turned over; and then under the same condition as above, the resin was infiltrated into the other side of the sheet by spin coating. Next, this was hot-pressed (5 tons, 150° C., 1 hour) to cure the resin, thereby giving an aligned single-walled CNTs-containing polyvinyl alcohol resin composite having a thickness of 26 µm.

The measurement data of the tensile strength and the Young's modulus of elasticity of the composite and the polyvinyl alcohol resin alone are shown in Table 2. In Table 2 and FIG. 8, "parallel" means the direction parallel to the alignment direction of CNTs; and "perpendicular" means the direction perpendicular to the alignment direction of CNTs.

Figure 7:
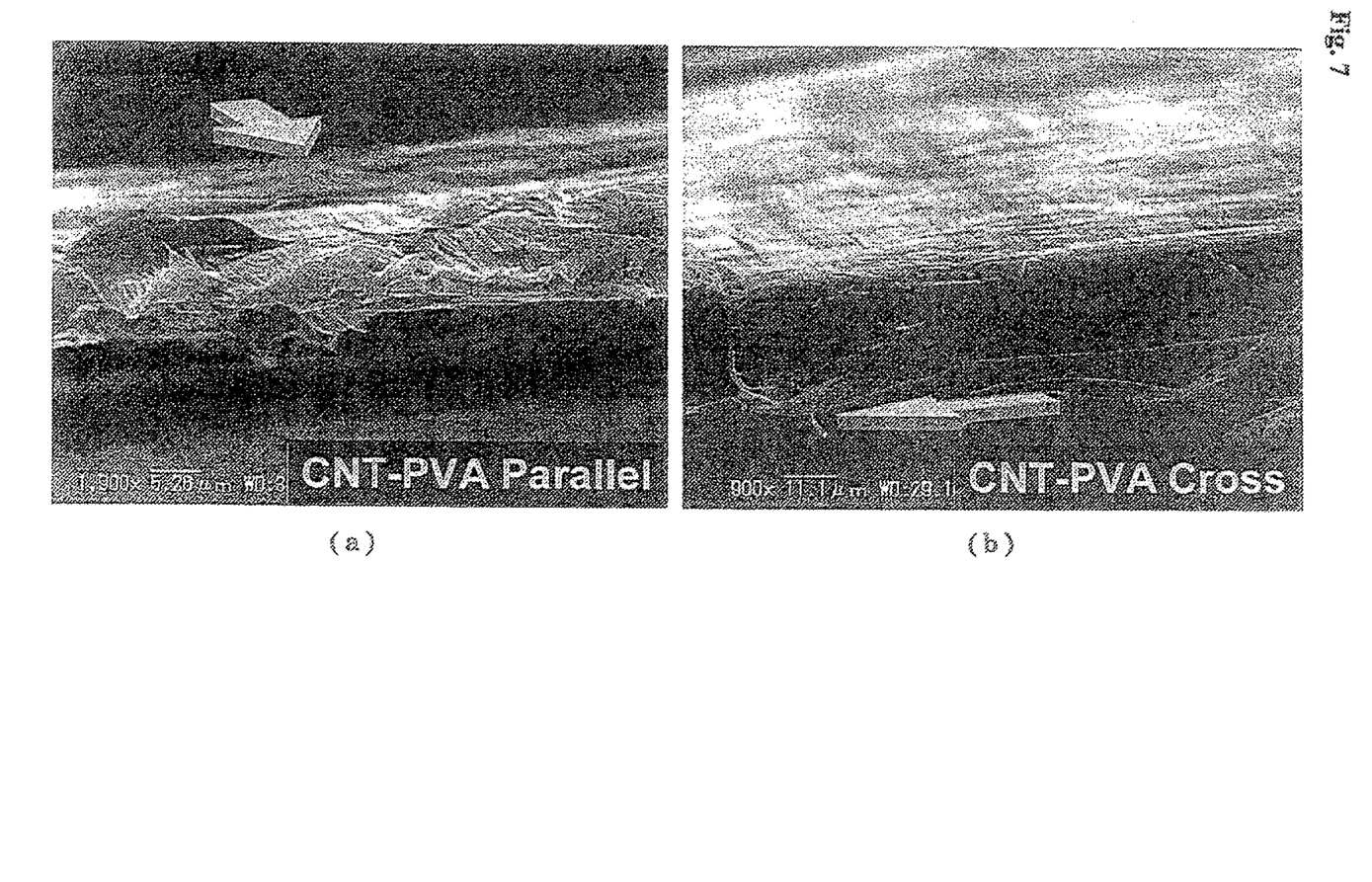
FIG. 7 shows scanning electron microscopic (SEM) images of the composite in Example 2.

After the tensile test, the broken surface of the sample was observed with a scanning electron microscope (SEM), which confirmed that the composite produced according to the invention had neither pores nor cracks and the CNTs and the resin were uniformly mixed therein and the CNTs were kept aligned (see FIG. 7 (*a*) is in the alignment direction, and (b) is in the direction perpendicular to the alignment direction). From these, it is known that the invention is effective for production of aligned CNTs-containing composite.

Figure 8:
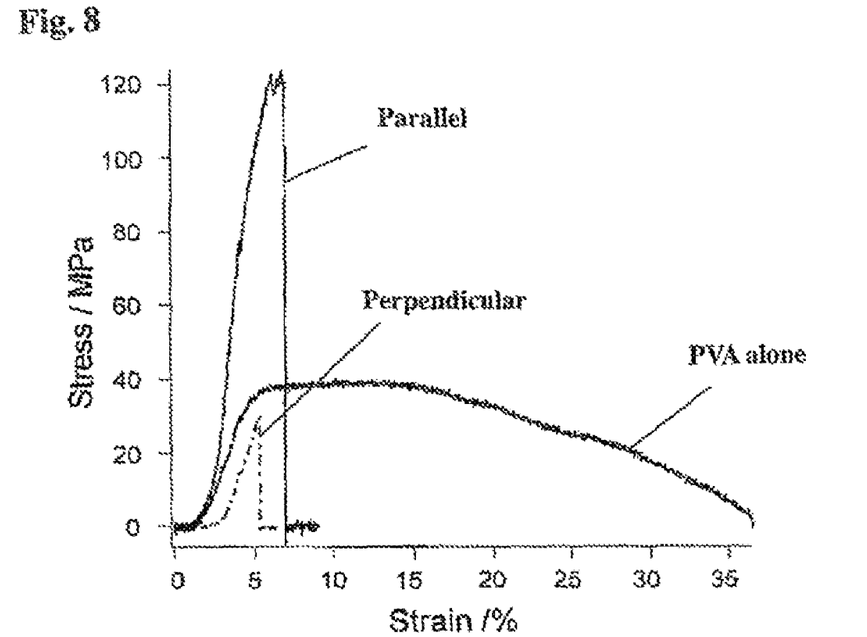
FIG. 8 is a graph showing the tensile test result of the composite in Example 2.

From the found data in Table 2 and the tensile test result in FIG. 8, it is known that the tensile strength in the CNTs alignment direction of the composite of the invention is about 4 times the tensile strength in the direction perpendicular thereto. The tensile strength in the CNTs alignment direction of the composite of the invention is 3 times that of the base, polyvinyl alcohol resin alone; and the Young's modulus of elasticity in the CNTs alignment direction of the composite of the invention is 3.3 times that of the base, polyvinyl alcohol resin alone.

Figure 9:
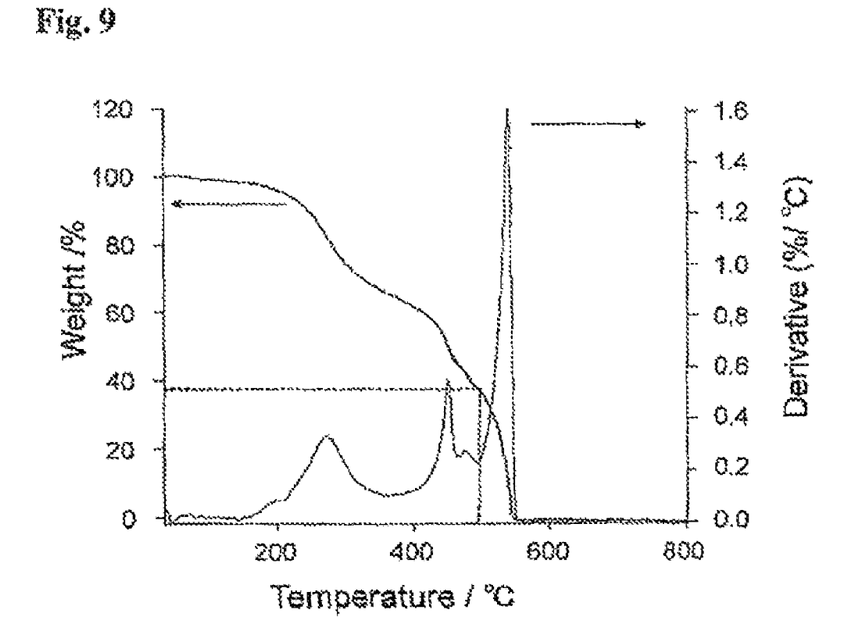
FIG. 9 is a graph showing the thermal weight measurement result of the composite in Example 2.

On the differential thermogravimetric analysis curve of FIG. 9, the weight reduction in the range of 500° C. or lower is caused by the combustion of the polyvinyl alcohol resin, the weight reduction at around 500° C. is caused by the combustion of CNTs, and the weight reduction ratio at around 500° C. greatly increases; and from these, the CNT weight content in the composite is computed as 38%.

Like in Example 1, the composite had a high degree of alignment and good shaping workability.

TABLE 2

|  | Tensile Strength (MPa) | Young's Modulus of Elasticity (GPa) |
| --- | --- | --- |
| CNT-PVA Composite (parallel) | 123.9 | 4.3 |
| CNT-PVA Composite (perpendicular) | 30.0 | 1.5 |
| PVA Alone | 40.3 | 1.3 |

The invention claimed is:

1. A carbon nanotubes-containing resin composite comprised of a resin-impregnated aligned carbon nanotube aggregate,
   wherein the carbon nanotube aggregate has a specific surface area of 600 to 2600 m$^2$/g,
   the carbon nanotube content is from 5 to 50 mass %,
   a ratio of tensile strength in the carbon nanotubes alignment direction and that in the direction perpendicular thereto of the composite is at least 1.5:1, and
   a ratio of Young's modulus of elasticity in the carbon nanotubes alignment direction and that in the direction perpendicular thereto of the composite is at least 1.5:1.

2. The carbon nanotubes-containing resin composite as claimed in claim 1, wherein a purity of the carbon nanotubes measured by fluorescence X-rays is 98% or more.

3. The carbon nanotubes-containing resin composite as claimed in claim 1, wherein the carbon nanotubes are singled-walled carbon nanotubes.

* * * * *